United States Patent
Chung et al.

(10) Patent No.: US 10,473,479 B2
(45) Date of Patent: Nov. 12, 2019

(54) METHOD FOR PROVIDING MAP INFORMATION AND ELECTRONIC DEVICE FOR SUPPORING THE SAME

(71) Applicant: Samsung Electronics Co., Ltd, Gyeonggi-do (KR)

(72) Inventors: Seung Yeon Chung, Seoul (KR); Jong Kyun Shin, Gyeonggi-do (KR); Pragam Rathore, Seoul (KR); Ki Hyoung Son, Gyeonggi-do (KR); Dong Oh Lee, Gyeonggi-do (KR); Kyu Hyung Choi, Seoul (KR); Won Sik Lee, Gyeonggi-do (KR); Hyun Yeul Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 15/384,224

(22) Filed: Dec. 19, 2016

(65) Prior Publication Data
US 2017/0176208 A1    Jun. 22, 2017

(30) Foreign Application Priority Data

Dec. 17, 2015  (KR) .................. 10-2015-0180672

(51) Int. Cl.
*H04N 7/18* (2006.01)
*G01C 21/36* (2006.01)
(Continued)

(52) U.S. Cl.
CPC ..... *G01C 21/3623* (2013.01); *G01C 21/3647* (2013.01); *G01C 21/3697* (2013.01);
(Continued)

(58) Field of Classification Search
CPC .................................................. G06T 19/006
(Continued)

(56) References Cited

U.S. PATENT DOCUMENTS

| 6,771,957 B2 | 8/2004 | Chitrapu |
| 7,076,246 B2 | 7/2006 | Chitrapu |

(Continued)

FOREIGN PATENT DOCUMENTS

| JP | 2000055681 | 2/2000 |
| KR | 20050044620 | 5/2005 |

(Continued)

*Primary Examiner* — Anand S Rao

(57) ABSTRACT

An electronic device is provided and includes a camera configured to obtain an image, and a location information sensor configured to obtain (or sense) a current location of the electronic device. The electronic device further includes a direction information sensor configured to obtain (or sense) direction information about a direction in which the camera obtains the image and a memory configured to store information about the current location. A processor configured to operatively connect with the location information sensor, the direction information sensor, and the memory, may be further configured to obtain map information corresponding to the current location and arrange and display an orientation of the obtained map information with an orientation corresponding to the direction information. The processor may be configured to output the obtained map information together with a live video obtained by the camera.

20 Claims, 15 Drawing Sheets

(51) Int. Cl.
   *H04N 5/232*     (2006.01)
   *H04N 5/262*     (2006.01)
   *H04N 21/85*     (2011.01)

(52) U.S. Cl.
   CPC ..... *H04N 5/23229* (2013.01); *H04N 5/23293* (2013.01); *H04N 5/2624* (2013.01); *H04N 7/183* (2013.01); *H04N 21/85* (2013.01); *G01C 21/3676* (2013.01)

(58) Field of Classification Search
   USPC ............... 348/42–60, 113–117, 135–160
   See application file for complete search history.

(56)  References Cited

U.S. PATENT DOCUMENTS

| | | |
|---|---|---|
| 7,313,393 B2 | 12/2007 | Chitrapu |
| 7,353,110 B2 | 4/2008 | Kim |
| 8,933,931 B2 * | 1/2015 | Balan .................... G06T 19/006 345/419 |
| 2003/0157932 A1 | 8/2003 | Chitrapu |
| 2004/0171390 A1 | 9/2004 | Chitrapu |
| 2005/0182564 A1 | 8/2005 | Kim |
| 2006/0258347 A1 | 11/2006 | Chitrapu |
| 2008/0090563 A1 | 4/2008 | Chitrapu |
| 2008/0171558 A1 | 7/2008 | Choi et al. |

FOREIGN PATENT DOCUMENTS

| | | |
|---|---|---|
| KR | 20060110188 | 10/2006 |
| KR | 101147718 B1 | 5/2012 |
| KR | 20150004233 | 1/2015 |
| KR | 20150088662 | 8/2015 |

* cited by examiner

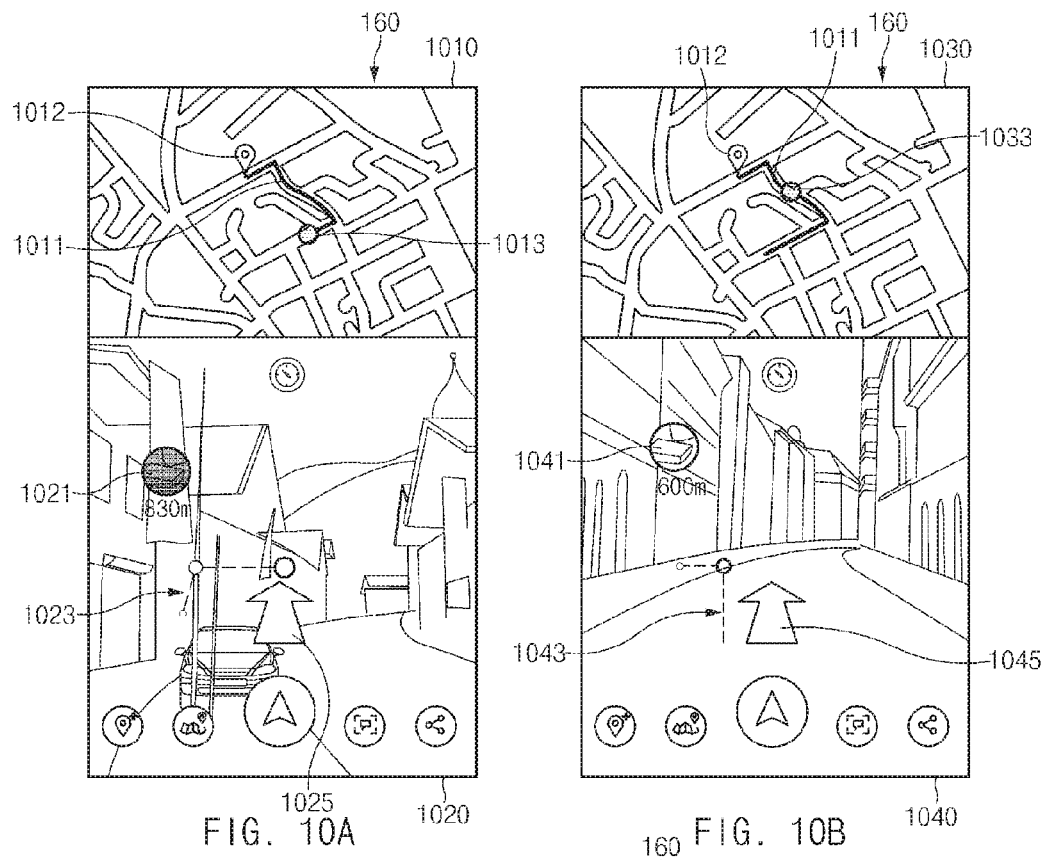
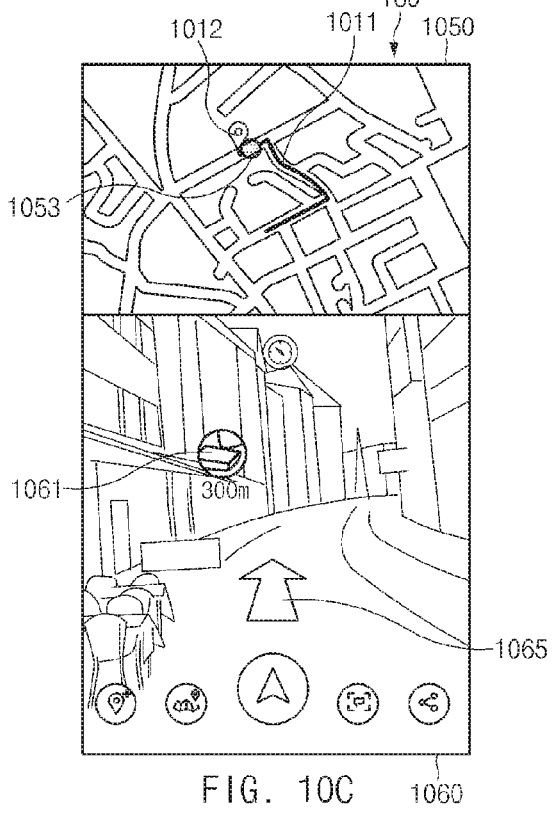
FIG. 10A
FIG. 10B
FIG. 10C

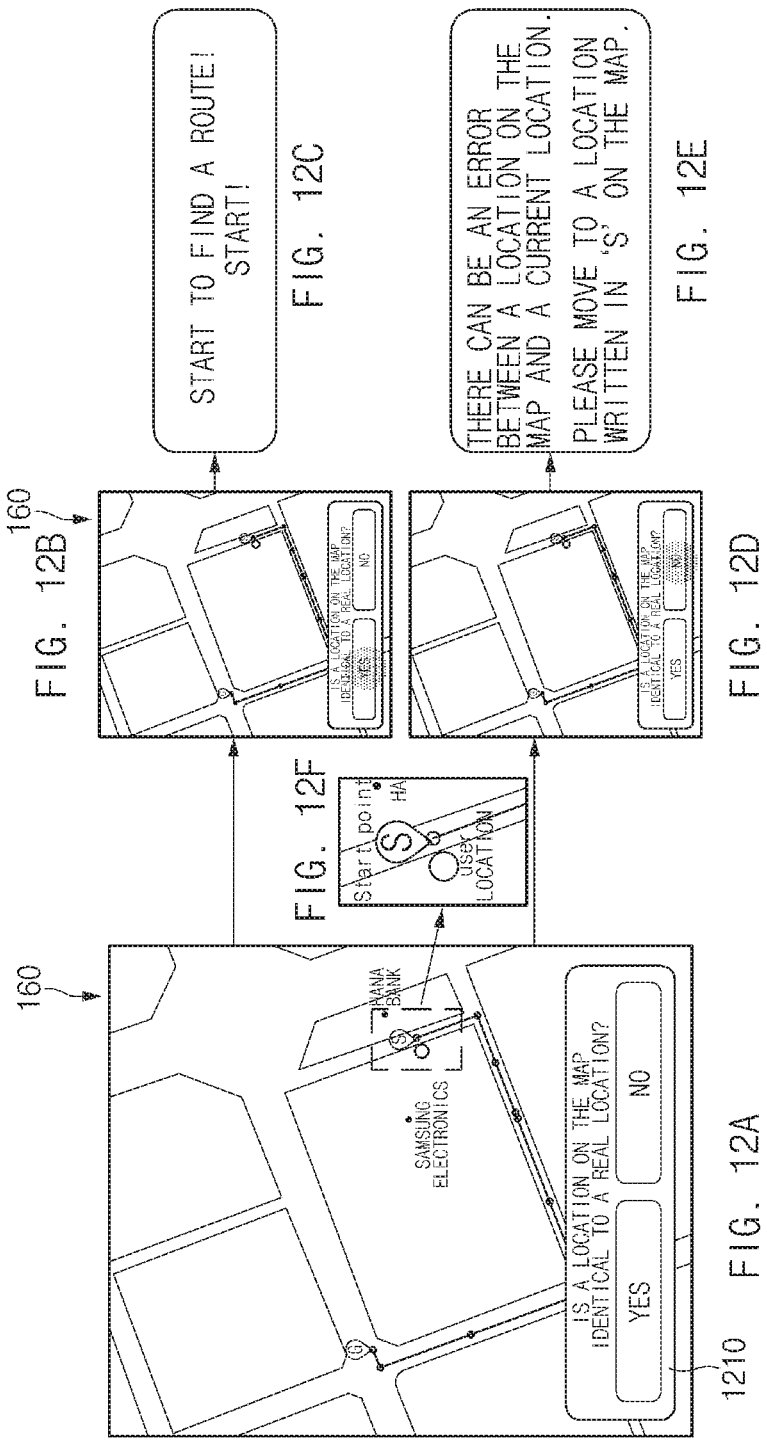

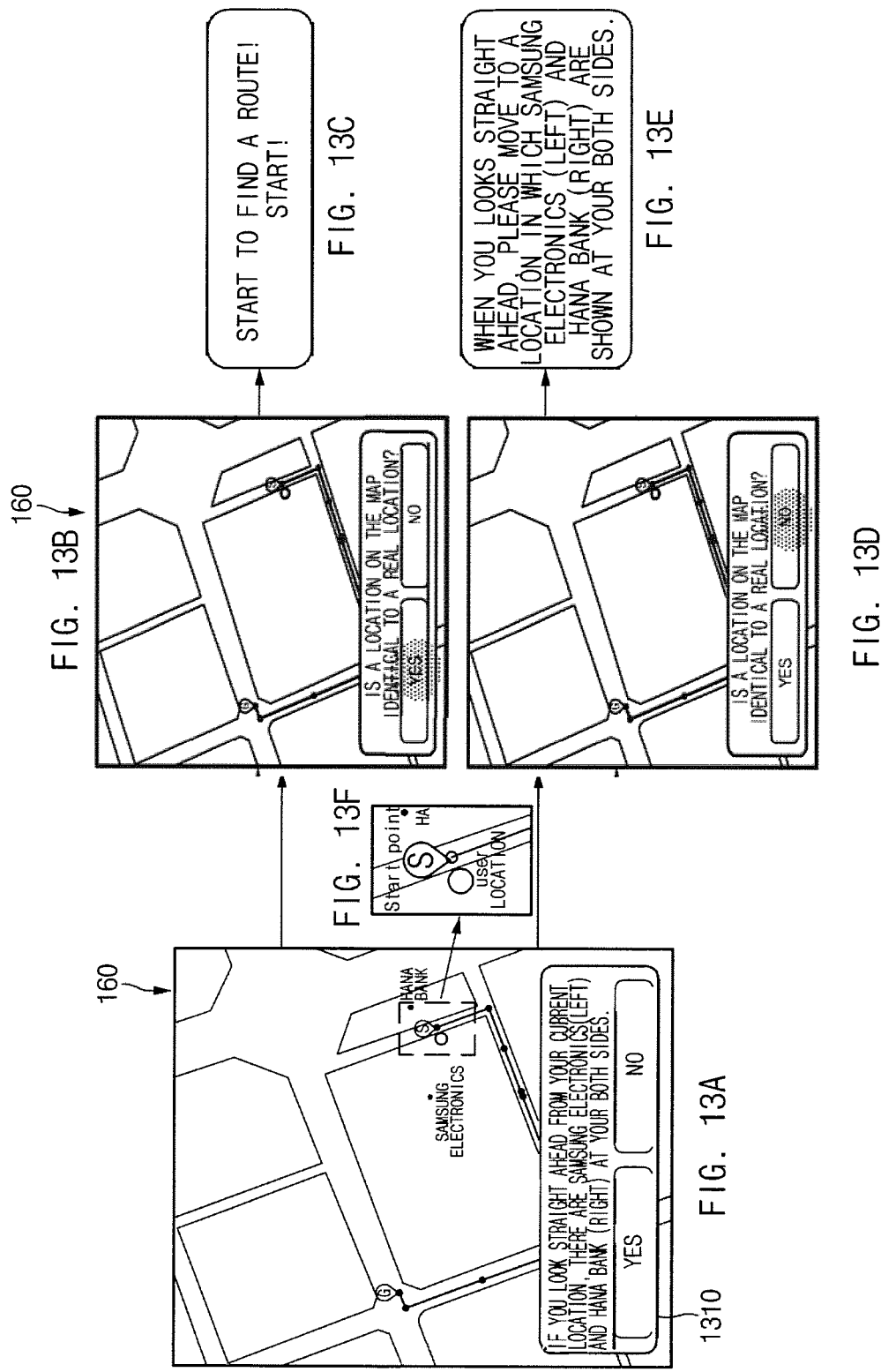

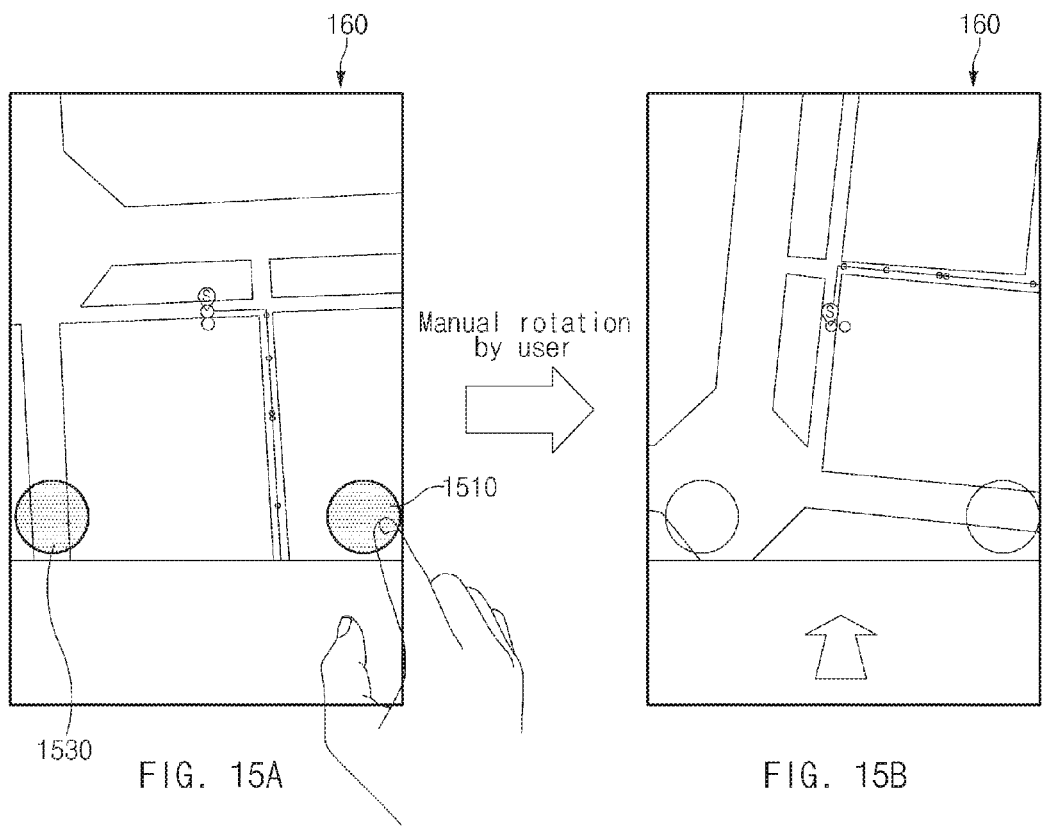

METHOD FOR PROVIDING MAP INFORMATION AND ELECTRONIC DEVICE FOR SUPPORING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Dec. 17, 2015 in the Korean Intellectual Property Office and assigned Serial number 10-2015-0180672, the entire disclosure of which is hereby incorporated by reference.

TECHNICAL FIELD

The present disclosure relates to technologies for providing map information.

BACKGROUND

A conventional electronic device provides map information. For example, the conventional electronic device obtains information about a current location of its user and provides map information of an area on the current location.

The conventional electronic device simply provides only map information or shows a route from a current location to a destination. Therefore, it is difficult to go to the destination based on only map the information in an environment where it is difficult to distinguish a direction.

SUMMARY

To address the above-discussed deficiencies, it is a primary object to provide a method for providing map information to easily distinguish a direction by simultaneously displaying map information and a live video and an electronic device for supporting the same.

In accordance with an aspect of the present disclosure, an electronic device is provided. The electronic device may include a camera configured to obtain an image, a location information sensor configured to obtain (or sense) a current location of the electronic device, a direction information sensor configured to obtain (or sense) direction information about a direction in which the camera obtains the image, a memory configured to store information about the current location, and a processor configured to operatively connect with the location information sensor, the direction information sensor, and the memory, wherein the processor may be configured to obtain map information corresponding to the current location and arrange and display an orientation of the obtained map information with an orientation corresponding to the direction information by outputting the obtained map information together with a live video obtained by the camera.

In accordance with another aspect of the present disclosure, a method for providing map information is provided. The method may include obtaining (or sensing) a current location of an electronic device or sensing direction information about a direction in which a camera of the electronic device obtains an image, obtaining map information corresponding to the current location, arranging an orientation of the obtained map information with an orientation of the direction information, and outputting the map information, the orientation of which is arranged, together with a live video obtained by the camera.

Other aspects and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A-10C illustrate a change of a screen interface based on access to a designation according to an embodiment of the present disclosure;

FIGS. 12A-12F illustrate a method for correcting map information according to an embodiment of the present disclosure;

FIGS. 13A-13F illustrate a method for correcting map information according to an embodiment of the present disclosure;

FIGS. 15A & 15b illustrate rotating map information according to an embodiment of the present disclosure.

Throughout the drawings, it should be noted that like reference numbers are used to depict the same or similar elements, features, and structures.

DETAILED DESCRIPTION

Figure 1:
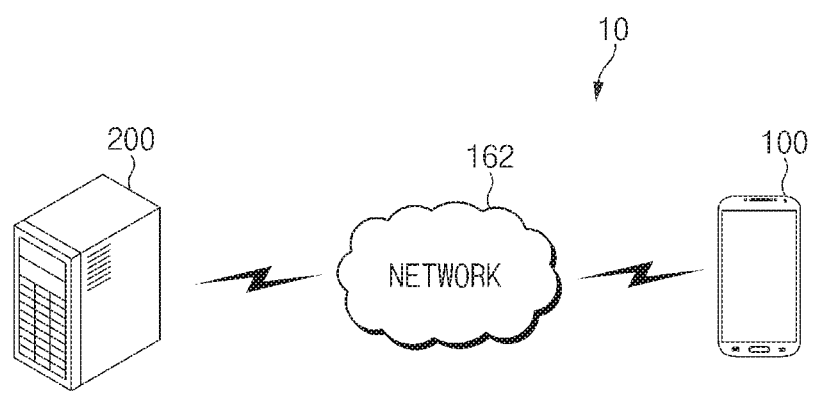
FIG. 1 illustrates an electronic device operation environment according to an embodiment of the present disclosure.

FIGS. 1 through 15B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Various embodiments of the present disclosure may be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 illustrates an electronic device operating in a network environment according to an embodiment of the present disclosure.

Referring to FIG. 1, an electronic device operation environment 10 may include an electronic device 100 and a server 200.

The electronic device 100 may output a live video obtained by its image sensor together in a process of outputting map information on its display. The electronic device 100 may display the map information and the live video such that a display direction of the map information is identical to a direction of the live video. The electronic device 100 may more intuitively and accurately perform a search for a destination and perform a movement to the destination. The electronic device 100 may receive map information from the server 200 over a network 162. According to various embodiments, the electronic device 100 may obtain destination information from a user input or schedule information stored in the electronic device 100 and may send the obtained destination information and current location information to the server 200. The electronic device 100 may obtain route map information, in which route information (e.g., information corresponding to a route between start location information and destination information) is written, from the server 200 or may calculate route map information based on input current location information and input destination information. If obtaining the route map information, the electronic device 100 may adjust a display orientation of the route map information based on direction information associated with a live video and may output the route map information, in which the display orientation is adjusted, together with the live video. Alternatively, the electronic device 100 may output map information obtained in connection with its current location (e.g., map information obtained from the server 200 or map information obtained based on a map database stored in a memory of the electronic device 100) together with a live video. For example, the electronic device 100 may match an orientation detected as direction information to a display orientation of map information to be displayed on its display and may display the map information such that the display orientation of the map information is oriented towards an upper side of the display.

The server 200 may provide map information to the electronic device 100. For example, the server 200 may include a storage device which may store a map database and a communication interface which communicates with the electronic device 100. The server 200 may receive current location information and destination information from the electronic device 100. The server 200 may produce route information based on the received current location information and the received destination information. The server 200 may generate route map information by writing the produced route information on a map. The server 200 may send the route map information to the electronic device 100. Alternatively, the server 200 may collect map information corresponding to location information (e.g., a current location or a specified location) provided from the electronic device 100 and may send the collected map information to the electronic device 100. The server 200 may receive location information in real time or at a period from the electronic device 100. The server 200 may send information, in which a current location of the electronic device 100 is applied to the map information or the route map information, to the electronic device 100.

The network 162 may establish a communication channel between the server 200 and the electronic device 100. The network 162 may send current location information of the electronic device 100 or destination information to the server 200. Also, the network 162 may send the map information, the route map information, and the like to the electronic device 100.

In the above-mentioned description, an embodiment is exemplified as the server 200 produces route information, generates and transmits route map information, and transmits information associated with displaying a current location of the electronic device 100. Various embodiments are not limited thereto. For example, the server 200 may provide a map database, which may be used to produce or generate route information, route map information, and the like, to the electronic device 100. If obtaining current location information and destination information, the electronic device 100 may produce route information based on a map database stored in its memory to output the route map information. Also, the electronic device 100 may obtain its location information in real time and may display its current location on the route map information.

Figure 2:
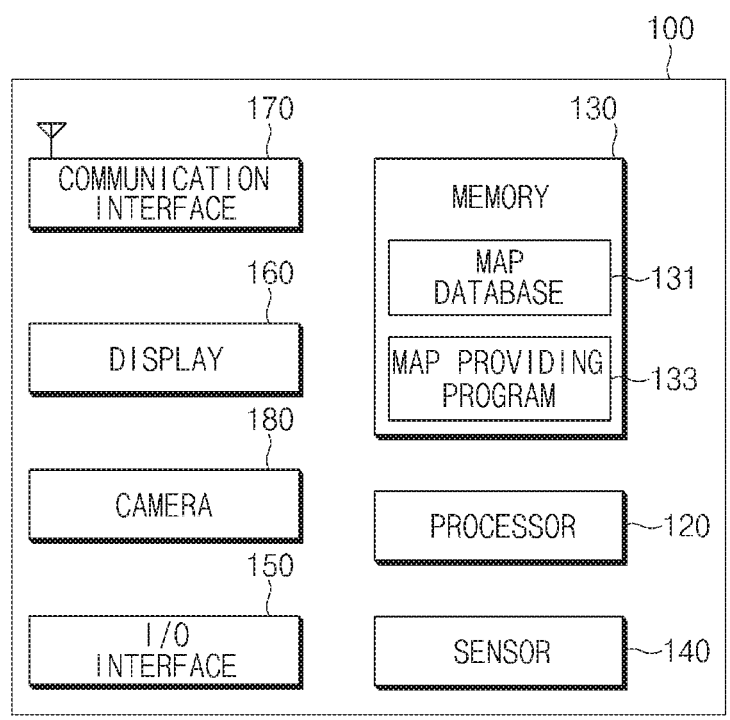
FIG. 2 is a block diagram illustrating a configuration of an electronic device according to an embodiment of the present disclosure.

FIG. 2 is a block diagram illustrating a configuration of an electronic device according to an embodiment.

Referring to FIG. 2, an electronic device 100 in an embodiment may include a processor 120, a memory 130, a sensor 140, an input/output (I/O) interface 150, a display 160, a communication interface 170, and a camera 180 (or an image sensor).

The memory 130 may store an operating system (OS) and the like associated with operating the electronic device 100. Also, the memory 130 may include a map providing program 133. The map providing program 133 may include an instruction set (e.g., a routine, a function, syntax, a class, and the like) configured to send current location information and destination information to the server 200 (as shown in FIG. 1), an instruction set configured to output received route map information on the display 160 if the route map information is received from the server 200, and the like. Alternatively, the map providing program 133 may include an instruction set configured to produce route information based on current location information and destination information, an instruction set configured to generate route map information by applying the produced route information to a map database 131, and an instruction set configured to display route map information and a live video by matching a display direction of the route map information to a direction of the live video. Alternatively, the map providing program 133 may include an instruction set configured to output various specified user interfaces based on a relationship between a destination and a current location. Alternatively, the map providing program 133 may include an instruction set configured to produce map information of an area relative to a current location and output the produced map information together with a live video. The memory 130 may include the map database 131. The map database 131 may be stored in the memory 130 upon manufacturing the electronic device 100 or may be obtained via the server 200 or an external electronic device. The map database 131 may be updated at a period.

The sensor 140 may include a direction information sensor which may obtain direction information of the electronic device 100. For example, the sensor 140 may include at least one sensor which may detect whether a direction where the camera 180 is arranged indicates any orientation. For example, the sensor 140 may include an acceleration sensor and a geomagnetic sensor which are associated with direction information. According to various embodiments, the sensor 140 may obtain current location information of the electronic device 100. In this regard, the sensor 140 may include a location information sensor. The sensor 140 may send the obtained direction information and the obtained location information to the processor 120. The above-mentioned sensor 140 may include one sensor which may simultaneously collect direction information and location information or a plurality of sensors which may collect direction information and location information, respectively.

The I/O interface 150 may include at least one device which may generate a user input signal of the electronic device 100. For example, the I/O interface 150 may include at least one button, a joystick, a touch pad, a touch panel, a keyboard, and the like. The I/O interface 150 may generate an input signal associated with turning on or off the electronic device 100, an input signal associated with executing a function of providing map information, and the like. According to various embodiments, the I/O interface 150 may include an audio device. The I/O interface 150 may output audio information associated with guiding a route. For example, the I/O interface 150 may output distance information between a current location and a destination, destination arrival notification information, notification information for notifying a user of the electronic device 100 of route deviation, and the like. According to various embodiments, the I/O interface 150 may collect a user command (e.g., a user voice). A function of providing map information may be executed or destination information may be input, based on the collected user command.

The display 160 may output information associated with operating the electronic device 100. According to an embodiment, the display 160 may output a screen including a first region where map information or route map information are displayed under control of the processor 120 and a second region where obtained image is output. In this regard, the display 160 may divide a display region into regions, each of which has a size, (e.g., equally or unequally divide the display region) and may output the map information and the image on the divided regions, respectively. The second region may display a live video obtained by the camera 180. According to various embodiments, the second region may display a specified photo image, a specified picture image (e.g., a destination related image), or the like. According to various embodiments, the first region may display main map information (e.g., map information, route map information, and the like), and the second region may display sub-map information. The sub-map information may be, for example, information generated based on at least part of the route information. The sub-map information may be overlaid and displayed with a live video displayed on the second region.

The communication interface 170 may support a communication function of the electronic device 100. For example, the communication interface 170 may establish a communication channel with the server 200 over the network 162. The communication interface 170 may send current location information and destination information to the server 200 in response to control of the processor 120. The communication interface 170 may receive route information or route map information in which the route information is written from the server 200 and may send the received information to the processor 120.

The camera 180 may obtain a live video under control of the processor 120. The live video obtained by the camera 180 may be output on the display 160 under control of the processor 120. According to an embodiment, if a function of providing map information is executed, the camera 180 may be automatically activated. Alternatively, if a distance between a found current location and a found destination is greater than or equal to a distance, the camera 180 may be automatically activated. Alternatively, if the function of providing map information is ended, the camera 180 may be automatically deactivated. Alternatively, if the current location is the same as the destination or if the distance between the current location and the destination is less than the distance, the camera 180 may be automatically deactivated.

The processor 120 may include one or more of a central processing unit (CPU), an application processor (AP), or a communication processor (CP). The processor 120 may execute, for example, calculation or data processing about control and/or communication of at least another component of the electronic device 100. In connection with executing the function of providing map information, the above-mentioned processor 120 may control to obtain current location information, to perform control associated with obtaining destination information, to arrange a direction in which a live video is obtained and a display direction of route map information (or a display direction of map information), to output the arranged route map information (or map information) and live video, and to output sub-map information overlaid with a display region which outputs the live video. For example, the processor 120 may match an orientation of an obtained direction to an orientation of map information and may display the map information such that a specified orientation of the map information is oriented towards a direction (e.g., an upper direction) of the display 160. Also, the processor 120 may control an output of each of various user interfaces associated with access to a destination or arriving at the destination.

Figure 3:
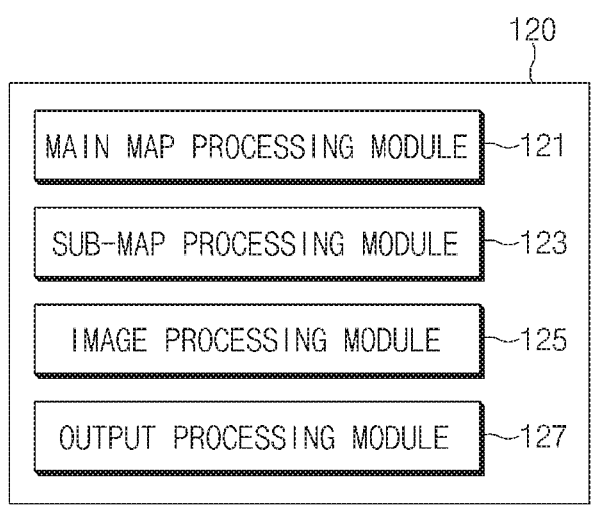
FIG. 3 is a block diagram illustrating a processor according to an embodiment of the present disclosure.

FIG. 3 is a block diagram illustrating an example of a processor according to an embodiment.

Referring to FIG. 3, a processor 120 according to an embodiment may include a main map processing module 121, a sub-map processing module 123, an image processing module 125, and an output processing module 127.

The main map processing module 121 may obtain main map information (e.g., map information or route map information) of an electronic device 100 of FIG. 2. According to an embodiment, the main map processing module 121 may obtain current location information by activating a location information sensor (not shown). According to various embodiments, a sensor 140 of the electronic device 100 may maintain a turn-on state and may provide sensor information (e.g., location information, direction information, and the like) at a period or in real time. The main map processing module 121 may refer to sensor information obtained by the sensor 140 if necessary, upon activation of a function of providing map information.

The main map processing module 121 may send the obtained current location information to a server 200 of FIG. 1 and may receive map information corresponding to an area relative to the current location information from the server 200. Alternatively, the main map processing module 121 may send the obtained current location information and the obtained destination information to the server 200 and may receive route map information, in which route information (including route information based on a route finding function and at least one line connected from a current location to a destination) from the server 200. The main map processing module 121 may output a user interface in connection with obtaining destination information. For example, the main map processing module 121 may output an input window, in which destination information is input, on a display 160 of FIG. 2. Alternatively, the main map processing module 121 may verify schedule information and may automatically obtain place name information, written in the schedule information, as destination information.

According to various embodiments, the main map processing module 121 may obtain map information corresponding to current location information based on a map database 131 stored in a memory 130 of FIG. 2. Alternatively, the main map processing module 121 may produce route map information corresponding to current location information and destination information based on the map database 131 stored in the memory 130. In connection with producing the route information, the main map processing module 121 may produce a shortest distance route, which connects the current location information with the destination information, among routes displayed on map information. According to various embodiments, the main map processing module 121 may obtain map information of an area in connection with a current location (e.g., obtain the map information from the server 200 or obtain the map information from a map database stored in the memory 130).

The sub-map processing module 123 may generate sub-map information in which at least part of route information produced by the main map processing module 121 is simplified or in which route information including the current location information and the destination information is simplified. For example, the sub-map processing module 123 may generate sub-map information by selecting part of the route information, simplifying lines included in the route information, or removing at least some of the lines included in the route information.

If the function of providing map information is activated, the image processing module 125 may activate a camera 180 of FIG. 2. The image processing module 125 may obtain a live video based on the activated camera 180. If the function of providing map information is deactivated, the image processing module 125 may deactivate the camera 180. According to various embodiments, if a distance between a current location and a destination is less than a distance while map information and a live video are provided, the image processing module 125 may deactivate the camera 180. Alternatively, if the distance between the current location and the destination is greater than or equal to the distance while map information is provided, the image processing module 125 may activate the camera 180.

If the function of providing map information is activated or if the camera 180 is activated in connection with providing a live video, the output processing module 127 may activate the sensor 140 to obtain direction information indicated by a specific portion of the electronic device 100. For example, the output processing module 127 may obtain orientation information about a direction in which the camera 180 which is arranged in a region of the electronic device 100 is oriented. According to an embodiment, the output processing module 127 may determine a direction in which the camera 180 is oriented as one of 8 orientations or 16 orientations. Alternatively, the output processing module 127 may determine a direction in which the camera 180 is oriented, based on classifying 2 orientations (front and rear), 4 orientations (north, south, east, and west), 32 orientations, and the like.

The output processing module 127 may output a user interface including a first region to output main map information (e.g., map information or route map information) and a second region to output a live video (or a specified image). In this regard, the output processing module 127 may divide a display region of the display 160 into regions, each of which has a size. According to an embodiment, the output processing module 127 may set the second region where a live video is output to be larger in size than a region of a first size, where main map information is output. According to various embodiments, the output processing module 127 may change a size of each of the first region and the second region in response to a user input. The output processing module 127 may output sub-map information on part of the second region. According to various embodiments, the output processing module 127 may overlay and output sub-map information with a live video displayed on the second region. The sub-map information may include an object corresponding to current location information.

The output processing module 127 may adjust a display orientation of main map information relative to a direction obtained via the sensor 140. For example, the output processing module 127 may rotate main map information such that a display orientation of main map information is identical to an orientation obtained via the sensor 140. The output processing module 127 may display the rotated main map information on the first region. According to various embodiments, if main map information is output based on executing the function of providing map information, the output processing module 127 may display the main map information and a live video by matching a display orientation of the main map information to a direction in which the live video is obtained. Alternatively, after the main map information and the live video are displayed, the output processing module 127 may adjust a display orientation of the main map information in response to a specified user input. According to various embodiments, the output processing module 127 may display sub-map information and a live video by matching a display direction of the sub-map information to a direction in which the live video is obtained. Alternatively, the output processing module 127 may display the sub-map information such that an upper side of a display direction of the sub-map information indicates a northward direction.

If a current location is changed based on movement of the electronic device 100, the output processing module 127 may change a location of an object which displays the current location on main map information or sub-map information. Also, the output processing module 127 may display a live video obtained based on movement, rotation, or the like of the electronic device 100 on the display 160.

The output processing module 127 may output various user interfaces based on a proximity distance between a destination and a current location. The output processing module 127 may display an object which displays a route close within a distance from a current location to be different from an object which displays a route which is spaced part from the current location at the distance or more. For example, the output processing module 127 may display an object corresponding to the route close to the current location to be brighter, clearer, or thicker than an object corresponding to the route spaced part from the current location. The output processing module 127 may output at least one of sharpness, resolution, or transparency of a specified image (e.g., a destination related image output on the first region or the second region) in a different way based on a proximity distance between a destination and a current location. If a current location deviates from a route, the output processing module 127 may provide a specified effect. For example, the output processing module 127 may process a region of a live video to be darker than a previous state or may output a specified pop-up image, text, or the like.

The output processing module 127 may output a pop-up and the like which inquires whether map information on which a current location is displayed is correct, at a time when the current location is displayed on main map information in connection with verifying the current location. The output processing module 127 may output a pop-up message and the like for requesting the main map processing module 121 to perform a route finding function or requesting to move to a specified location, in response to a user input. If a user of the electronic device 100 is located within an adjacent distance around a destination, the output processing module 127 may provide walking information (e.g., the number of steps) about a remaining distance. The output processing module 127 may finely adjust an angle with respect to a display direction of main map information, based on a user input.

According to various embodiments, an electronic device may include a first sensor (e.g., a location information sensor) configured to obtain (or sense) a current location of the electronic device, a second sensor (e.g., a direction information sensor) configured to obtain (or sense) direction information about a direction in which a camera of the electronic device obtains an image, a memory configured to store the current location, and a processor configured to operatively connect with the sensor (e.g., the first sensor or the second sensor) and the memory. The processor may be configured to obtain map information corresponding to the current location, generate map information in which a display orientation of the obtained map information is arranged in an orientation of the direction information, and output the arranged map information together with a live video obtained by the camera. Alternatively, the processor may be configured to simultaneously output the map information and the live video on a display of the electronic device and adjust and output the map information such that a display orientation of the map information is identical to a direction in which the electronic device is oriented.

For example, if direction information currently indicated by a specific surface of the electronic device (e.g., a surface where the camera is arranged) indicates the north, the processor may display map information such that the north among display orientations of map information is a direction (e.g., an upper direction) of the display. Alternatively, if an orientation of direction information indicates the east, the processor may display map information such that the east among the display orientations of the map information is the upper direction of the display.

According to an embodiment of the present disclosure, the electronic device may include a camera configured to obtain an image, a location information sensor configured to obtain (or sense) a current location of the electronic device, a direction information sensor configured to obtain (or sense) direction information about a direction in which the camera obtains the image, a memory configured to store information about the current location, and a processor configured to operatively connect with the location information sensor, the direction information sensor, and the memory, wherein the processor may be configured to obtain map information corresponding to the current location and arrange and display an orientation of the obtained map information with an orientation corresponding to the direction information by outputting the obtained map information together with a live video obtained by the camera.

According to various embodiments of the present disclosure, the processor may be configured to output the map information on a first region of a display of the electronic device, output the live video on a second region of the display, and arrange and display a display orientation of the map information with an orientation of the direction information in response to a user input.

According to various embodiments of the present disclosure, the processor may be configured to collect route map information in which route information produced based on information about a destination and the information about the current location is written and arrange and display a display orientation of the route map information with a display orientation of the direction information.

According to various embodiments of the present disclosure, the processor may be configured to adjust a display orientation of the map information in response to an orientation of changed direction information, if the direction information is changed based on movement of the electronic device and display the adjusted map information.

According to various embodiments of the present disclosure, the processor may be configured to output sub-map information corresponding to route information produced based on information about a destination and the information about the current location on a region where the live video is output.

According to various embodiments of the present disclosure, the processor may be configured to change a form of the sub-map information based on a changed distance or direction, if the distance or direction from the current location to the destination is changed in response to movement of the electronic device and display only a route from the moved current location to the destination.

According to various embodiments of the present disclosure, the processor may be configured to display a direction indication object corresponding to a progress direction which is oriented from the current location to a destination, based on a route produced using information about the destination and the information about the current location and display a direction indication object, a direction of which is changed if necessary, if the electronic device arrives at an intersection area based on movement of the electronic device.

According to various embodiments of the present disclosure, the processor may be configured to output a display effect for notifying route deviation, if the electronic device deviates from the current location on a route produced based on information about a destination and the information about the current location.

According to various embodiments of the present disclosure, the processor may be configured to display an image object associated with a destination using a different display form in response to a distance between the current location and the destination.

According to various embodiments of the present disclosure, the processor may be configured to stop outputting the live video, if a distance between the current location and a destination is less than a distance and output a destination related image object on a region where the live region is output.

According to various embodiments of the present disclosure, the processor may be configured to calculate and output the number of steps corresponding to a distance between the current location and a destination.

According to various embodiments of the present disclosure, the processor may be configured to execute a route finding function for destination information based on receiving a user input for determining whether the current location is identical to a start location displayed on a map or outputting guide information for guiding movement of the start location.

Figure 4:
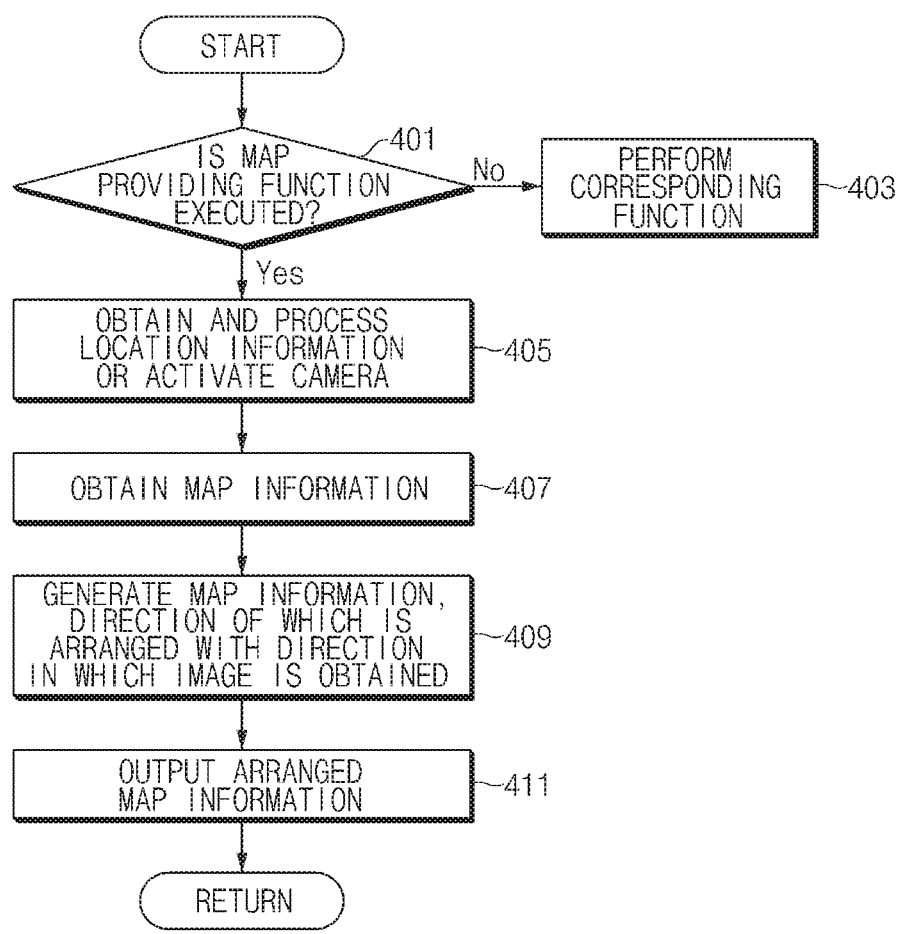
FIG. 4 is a flowchart illustrating a method for providing map information according to an embodiment of the present disclosure.

FIG. 4 is a flowchart illustrating an example of a method for providing map information according to an embodiment.

Referring to FIG. 4, in connection with the method for providing map information according to an embodiment, in operation 401, a processor 120 of an electronic device 100 of FIG. 2 (e.g., a main map processing module 121 of FIG. 3) may determine whether an event associated with executing the function of providing map information is generated. In this regard, the processor 120 may provide a menu, an item, and the like associated with executing the function of providing map information. For example, the processor 120 may provide a menu for executing the function of providing map information through a camera function, a gallery function, a map search function, a navigation function, and the like. Alternatively, the processor 120 may display a specified icon on a display 160 of FIG. 2. Alternatively, if a specified gesture event is generated, the processor 120 may recognize the generated gesture event as an event for requesting to execute the function of providing map information.

In operation 403, the processor 120 may perform a function according to a type of the generated event. For example, if an event associated with other user functions, for example, a camera function, a file editing function, a web search function, and the like except for the function of providing map information, is generated, the processor 120 may execute an application associated with executing the corresponding function.

If the event associated with executing the function of providing map information is generated, in operation 405, the processor 120 (e.g., the main map processing module 121) may obtain and process location information. Alternatively, the processor 120 (e.g., an image processing module 125 of FIG. 3) may activate a camera 180 of FIG. 2. In this regard, the processor 120 may activate a sensor 140 of FIG. 2 which may obtain location information. While activating the camera 180, the processor 120 may determine orientation information about a direction indicated by the camera 180 or a direction in which a live video is obtained, based on the sensor 140.

If obtaining the location information, in operation 407, the processor 120 may send the obtained location information to a server 200 of FIG. 1 and may receive map information corresponding to a region relative to a current location from the server 200. Alternatively, in operation 407, the processor 120 may produce map information corresponding to an area relative to a current location based on a map database 131 stored in a memory 130 of FIG. 2.

In operation 409, the processor 120 (e.g., the main map processing module 121 or a sub-map processing module 123 of FIG. 3) may generate map information, a direction of which is arranged with a direction in which an image is obtained. According to an embodiment, the processor 120 may adjust a display direction of the map information, with respect to information about a direction (or orientation) in which a live video is obtained. Alternatively, the processor 120 may rotate map information displayed such that a northward direction is oriented towards an upper side of the display 160 based on a previous setting to display the map information such that a specific orientation of the map information is arranged with (or identical to) an orientation in which a live video is obtained.

In operation 411, the processor 120 (e.g., an output processing module 127 of FIG. 3) may output the arranged map information. In this operation, the processor 120 may output map information on a first region of the display 160 and may output a live video on a second region of the display 160. Alternatively, the processor 120 may display at least part (e.g., route information) of the obtained map information on the second region in the form of an overlay.

Figure 5:
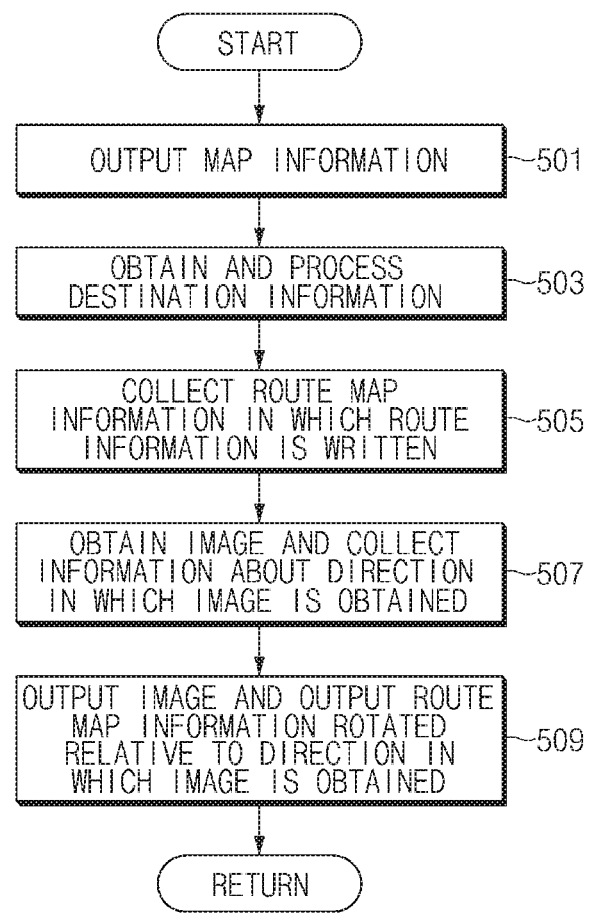
FIG. 5 is a flowchart illustrating a method for providing map information according to an embodiment of the present disclosure.

FIG. 5 is a flowchart illustrating another example of a method for providing map information according to an embodiment.

Referring to FIG. 5, in connection with the method for providing map information, in operation 501, a processor 120 (e.g., a main map processing module 121) of FIG. 3 may output map information. For example, the processor 120 may obtain and output map information from a server 200 of FIG. 1 or based on a map database 131 stored in a memory 130 of FIG. 2 in response to occurrence of a user input or executing a specified application. In this operation, the processor 120 may obtain information about a current location using a sensor 140 of FIG. 2 and may obtain and output map information corresponding to an area relative to the current location.

In operation 503, the processor 120 (e.g., the main map processing module 121) may obtain and process destination information. In this regard, the processor 120 may output a user interface associated with obtaining the destination information and may obtain the destination information corresponding to a user input. Alternatively, the processor 120 may verify schedule information mapped to a current time or a current location and may obtain place name information which is written on the corresponding schedule information as destination information. If receiving map information from the server 200, the processor 120 may send the obtained destination information to the server 200. Alternatively, the processor 120 may produce route information based on the map database 131 stored in the memory 130.

In operation 505, the processor 120 (e.g., the main map processing module 121) may obtain route map information in which route information is written. For example, the processor 120 may receive the route map information from the server 200. Alternatively, the processor 120 may generate route map information using route information produced based on the map database 131 of the memory 130.

In operation 507, the processor 120 (e.g., an image processing module 125 and an output processing module 127 of FIG. 3) may obtain an image and may collect information about a direction in which the image is obtained. For example, the processor 120 (e.g., the image processing module 125) may activate the camera 180 before route map information is output and may obtain a live video via the camera 180. The processor 120 (e.g., the output processing module 127) may produce orientation information of a direction in which the live video is obtained.

In operation 509, the processor 120 (e.g., the output processing module 127) may output the image and may output route map information rotated relative to the direction in which the image is obtained. For example, the processor 120 may divide a display region of the display 160 into regions, each of which has a specified size, in connection with outputting the obtained live video and the route map information. The processor 120 may output the live video and the route map information on specified regions, respectively. In this regard, the processor 120 may output the route map information by matching a display direction of the route map information to obtained orientation information. For example, the processor 120 may change an orientation of route map information relative to orientation information of a direction in which a live video is obtained (e.g., rotate the route map information such that the orientation of the route map information is identical to an orientation of the direction in which the live video is obtained) and may display the changed route map information. Alternatively, the processor 120 may display route map information such that an orientation of the route map information corresponding to an orientation of a direction in which a live video is obtained is arranged with a direction of the display 160. According to an embodiment, if a direction in which a live video is obtained is a south-southwest direction, the processor 120 may display route map information such that the south-southwest direction among orientations of the route map information is arranged with an upper direction of the display 160.

Figure 6:
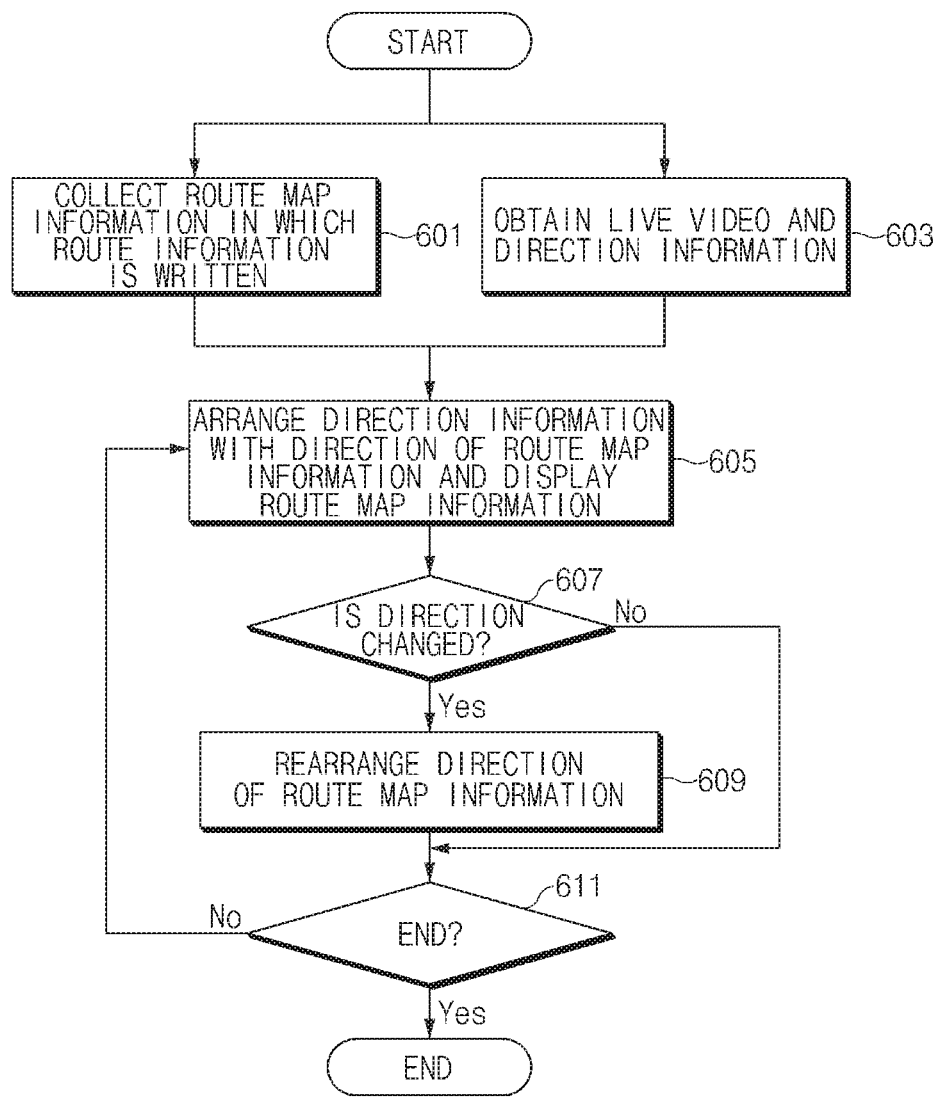
FIG. 6 is a flowchart illustrating a method for providing map information according to an embodiment of the present disclosure.

FIG. 6 is a flowchart illustrating another example of a method for providing map information according to an embodiment.

Referring to FIG. 6, in connection with the method for providing map information, in operation 601, a processor 120 (e.g., a main map processing module 121) of FIG. 3 may obtain route map information in which route information is written. Also, in operation 603, the processor 120 (e.g., an image processing module 125 and an output processing module 127 of FIG. 3) may obtain a live image and may obtain direction information (e.g., an orientation value of a direction in which a camera 180 of FIG. 2 obtains an image). Operations 601 and 603 may be performed irrespective of their order. In connection with the above-mentioned operations, the processor 120 may obtain current location information and destination information and may produce route map information based on the current location information and the destination information. Alternatively, the processor 120 may activate the camera 180 based on a user input or scheduled information to obtain a live video. When activating the camera 180 or when obtaining the route map information, the processor 120 may activate a sensor 140 of FIG. 2 or may produce an orientation value of a direction in which the camera 180 is oriented, using the activated sensor 140.

In operation 605, the processor 120 (e.g., the output processing module 127) may arrange the direction information with a direction of the route map information and may display the arranged route map information. For example, the processor 120 may change a display orientation of the route map information with respect to orientation information produced based on sensor information to be identical to an orientation based on the sensor information. In this operation, the processor 120 may divide a display region of a display 160 of FIG. 2 into regions and may display route map information, in which a display orientation is identical to orientation information obtained from sensor information, on one of the divided regions. According to various embodiments, if currently obtained orientation information is identical to a basic display orientation of route map information (e.g., a form where the north is oriented to an upper side), route map information may be displayed without rotation.

In operation 607, the processor 120 (e.g., the output processing module 127) may determine whether a direction is changed. For example, the processor 120 may analyze sensor information obtained from the sensor 140 to determine whether an orientation value is different from a previous value. If the direction (or an orientation value) is not changed, the processor 120 may skip operation 609. If the direction (or the orientation value) is changed, in operation 609, the processor 120 may rearrange a direction of the route map information. For example, the processor 120 may adjust a display direction of the route map information to correspond to a newly changed orientation value.

In operation 611, the processor 120 may determine whether an event associated with ending the function of providing map information is generated. If the event associated with ending the function of providing map information is not generated, the processor 120 may branch to operation 605 to perform the operation from operation 605.

According to various embodiments, a method for providing map information in an electronic device may include sensing a current location of an electronic device or sensing direction information about a direction in which a camera of the electronic device obtains an image, obtaining map information corresponding to the current location, arranging an orientation of the obtained map information with an orientation of the direction information and outputting the map information, the orientation of which is arranged, together with a live video obtained by the camera.

According to various embodiments, a method for providing map information in an electronic device may include obtaining map information in a current location of the electronic device while obtaining a live video and simultaneously displaying the live video while displaying the map information such that a direction in which the live video is obtained is identical to a specific orientation of the map information.

According to various embodiments, the outputting may include outputting the map information on a first region of a display of the electronic device and outputting the live video on a second region of the display and arranging and displaying a display orientation of the map information with an orientation of the direction information in response to a user input.

According to various embodiments, the method may further include collecting route map information in which route information produced based on information about a destination and information about the current location is written, wherein the outputting may include arranging and displaying a display orientation of the route map information with a display orientation of the direction information.

According to various embodiments, the method may further include adjusting a display orientation of the map information in response to an orientation of changed direction information, if the direction information is changed based on movement of the electronic device.

According to various embodiments, the method may further include displaying sub-map information corresponding to at least part of route information produced based on information about a destination and information about the current location on a region where the live video is output.

According to various embodiments, the displaying of the sub-map information may include changing a form of the sub-map information, if a distance between the current location and the destination is changed in response to movement of the electronic device and displaying only a route from the moved current location to the destination.

According to various embodiments, the method may further include producing a route using information about a destination and information about the current location, and the method may further include one of displaying a direction indication object corresponding to a progress direction and displaying a direction indication object, a direction of which is changed if necessary, if the electronic device arrives at an intersection area based on movement of the electronic device; outputting a display effect for notifying route deviation, if the electronic device deviates from the current location on the produced route; displaying an image object associated with the destination using a different display form in response to a distance between the current location and the destination; stopping outputting the live video if the distance between the current location and a destination is less than a distance and outputting a destination related image object on a region where the live region is output; or calculating and outputting the number of steps corresponding to the distance between the current location and a destination.

Figure 7A:
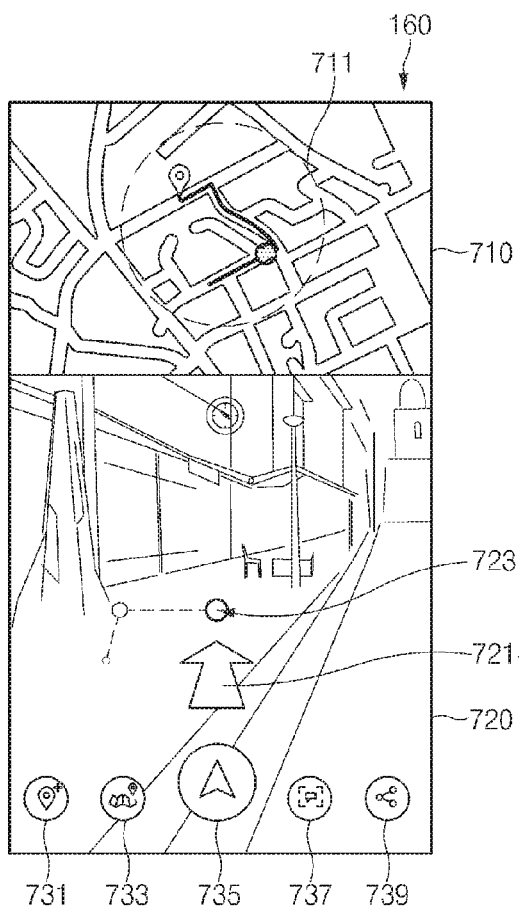
FIGS. 7A & 7B illustrate a screen interface associated with arranging a map information direction according to an embodiment of the present disclosure.
Figure 7B:
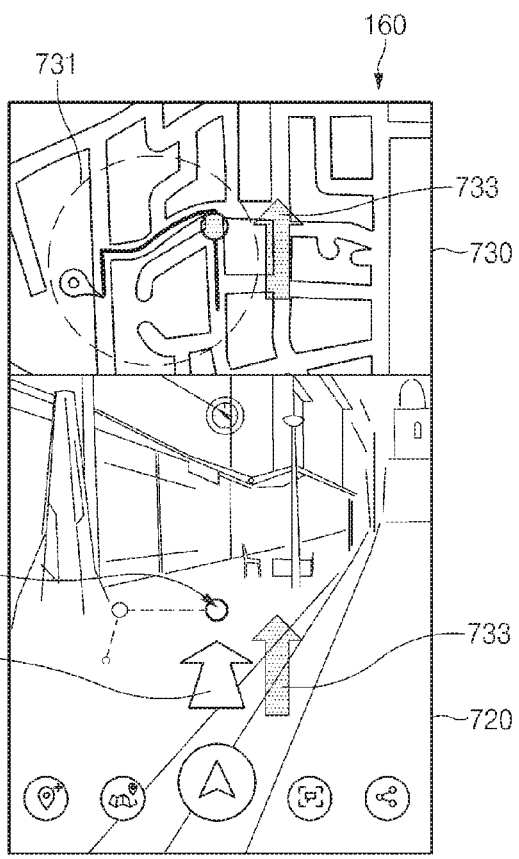

FIGS. 7A and 7B is a drawing illustrating an example of a screen interface associated with arranging a map information direction according to an embodiment.

Referring to FIG. 7A, a display 160 of an electronic device (for example, electronic device 100 of FIG. 2) may include a first region 710 where main map information (e.g., map information or route map information) is displayed and a second region 720 where an image is output. The main map information output on the first region 710 may be map information obtained based on current location information of the electronic device 100 (e.g., map information corresponding to an area relative to the current location information) or may be route map information to which route information 711 produced based on the current location information and destination information is applied. The route information 711 may be displayed as an area on map information.

In FIGS. 7A and 7B, embodiments are exemplified having all of the route information 711 is included in the first region 710. However, various embodiments are not limited thereto. For example, the entire display region of the route information 711 may be larger than the first region 710 displayed on the display 160 (not shown). The main map information displayed on the first region 710 may be displayed based on, for example, an orientation (e.g., the north of map information is oriented to an upper side of the display 160) set to a default.

In connection with outputting the image on the second region 720, the electronic device 100 may activate a camera 180 of FIG. 2 and may output a live video obtained from the camera 180 on the second region 720. In this operation, the electronic device 100 may display sub-map information 723 or a direction indication object 721 on a location of the second region 720. According to an embodiment, the electronic device 100 may arrange the direction indication object 721 on a lower end of the center of a screen of the display 160. The electronic device 100 may arrange the sub-map information 723 on a left middle end of the second region 720. The sub-map information 723 may be, for example, information corresponding to the route information 711 or information in which the route information 711 is simplified (e.g., in which a curve of the route information 711 is linearized or in which only part of the route information 711 is displayed).

According to various embodiments, the electronic device 100 may adjust a direction of the main map information displayed on the first region 710 based on a user input or automatically. For example, the electronic device 100 may activate a sensor (for example, sensor 140 of FIG. 2) and may calculate an orientation value of a direction in which a live video is obtained (e.g., a direction faced by a rear surface of the electronic device 100). The electronic device 100 may match the direction in which the live video is obtained to a display orientation of the main map information. For example, the electronic device 100 may rotate the main map information such that an orientation of the main map information corresponding to an obtained direction is displayed in parallel. Thus, as shown in FIG. 7B, the electronic device 100 may display map information, an azimuth of which rotates at an angle, on the first region 730. Rotated route information 731 may be displayed on the display 160 in response to rotation of the map information.

The electronic device 100 may output a live video on the second region 720 of state 703. The electronic device 100 may output the direction indication object 723, the sub-map information 721, or an object 733 indicating whether directions are the same as each other. The object 733 indicating whether the directions are the same as each other may be temporarily output on the display 160 and may then be removed.

According to various embodiments, the electronic device 100 may output various objects on a region of the display 160 (e.g., a lower end of the second region 720). For example, the electronic device 100 may display the first object 731 associated with indicating destination information, a second object 733 associated with storing a current live video or map information, a third object 735 indicating a navigation state (or a state while a route finding function is performed), a fourth object 737 associated with a note function, and a fifth object 739 associated with a location sharing function on the display 160. According to various embodiments, the electronic device 100 may output a compass image on the second region 720 (e.g., an upper end of the second region 720) to easily distinguish an orientation.

FIGS. 8A, 8B, 8C, and 8D illustrate a screen interface associated with a direction guide according to various embodiments.

Figure 8A:
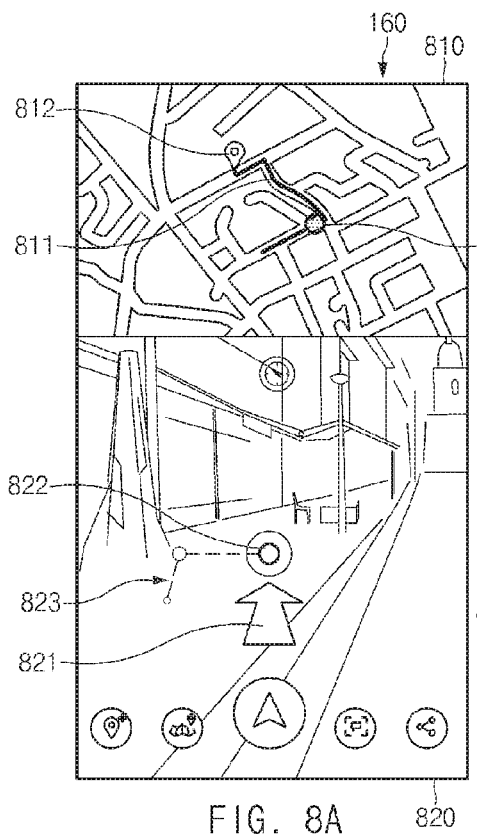
FIGS. 8A-8D illustrate a screen interface associated with a direction guide according to an embodiment of the present disclosure.

Referring to FIG. 8A, an electronic device (for example, electronic device 100 of FIG. 2) may display main map information on a first region 810 of a display 160 and may output a live video obtained by a camera (for example, camera 180 of FIG. 2) on a second region 820. For example, a destination object 812, a route object 811, and a first current location object 813 may be displayed on map information of the first region 810. The first current location object 813 may be, for example, an object displayed based on sensor information of a point where the electronic device 100 is currently located. The destination object 812 may be specified based on a user input or may be displayed in response to a touch event which occurs on map information. The route object 811 may be an object corresponding to route information produced based on current location information and destination information. First sub-map information 823 and a first direction indication object 821 may be displayed on the second region 820. Also, a point associated with a current location may be distinctively displayed from another adjacent point 822 on the first sub-map information 823.

Figure 8B:
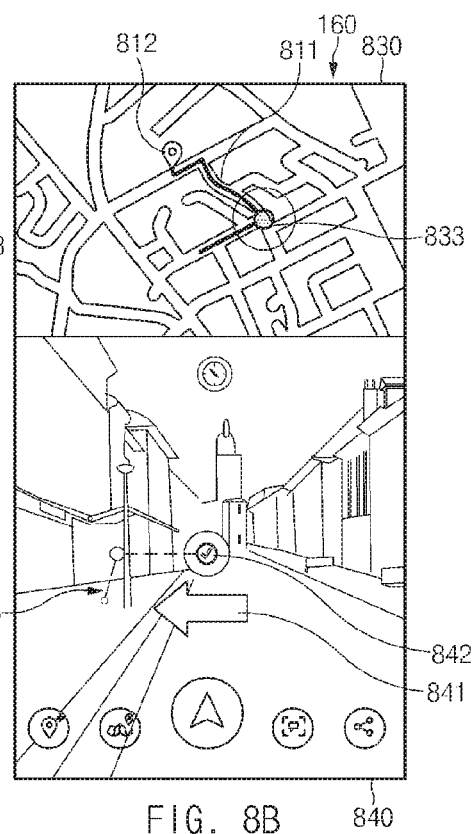

Referring to FIG. 8B, as the electronic device is moved (for example, electronic device 100 in FIG. 2), the destination object 812, the route object 811, and a second current location object 833 may be displayed on a first region 830. The second current location object 833 may be an object displayed in response to a current location at a second point different from a first point in response to movement of the electronic device 100. If a user of the electronic device 100 is located at an intersection based on movement of the electronic device 100, the electronic device 100 may display a second direction indication object 841 on a second region 840. The second direction indication object 841 may represent a state where the user should change his or her direction to move to a destination if he or she is located in an intersection area. If a current location of the electronic device 100 is identical to an intersection point, the electronic device 100 may output an intersection notification object 842 associated with arriving at an intersection on second sub-map information 843 of the second region 840.

Figure 8C:
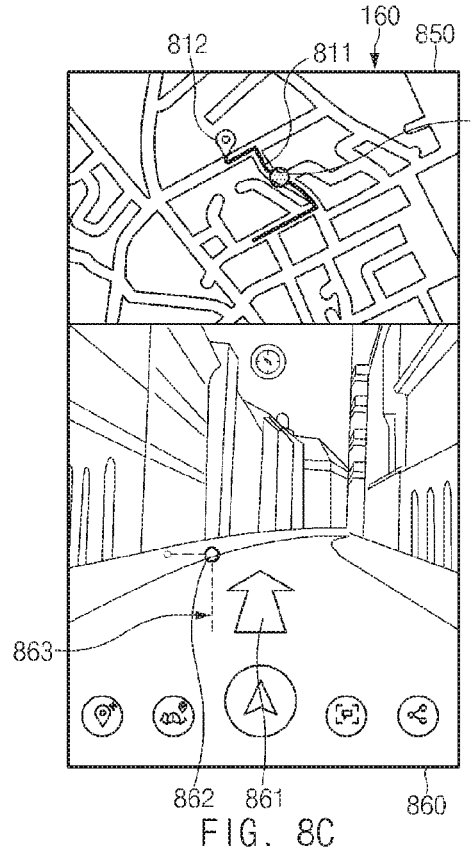

Referring to FIG. 8C, as the electronic device continues to be moved, the destination object 812, the route object 811, and a third current location object 853 may be displayed on a first region 850. The third current location object 953 may be displayed on a location spaced apart at a distance from a point where the second current location object 833 is displayed as the electronic device 100 is additionally moved. Third sub-map information 863 and a third direction indication object 861 may be output on a second region 860. The third direction indication object 861 may include an object for guiding the user to turn in a left direction and continuously go forward. According to various embodiments, if a progress direction of the electronic device 100 (or a direction in which a live video is obtained) is changed through a left turn, a display direction of main map information displayed on the first region 850 may be maintained or changed. For example, as the direction is changed, the electronic device 100 may rotate and display the main map information to match a display orientation of the main map information to an orientation value of a direction in which a live video is obtained. For example, as the electronic device 100 is moved, the third sub-map information 863 may be displayed in the form of including only information corresponding to the remaining route 862 from a current location to a destination.

Figure 8D:
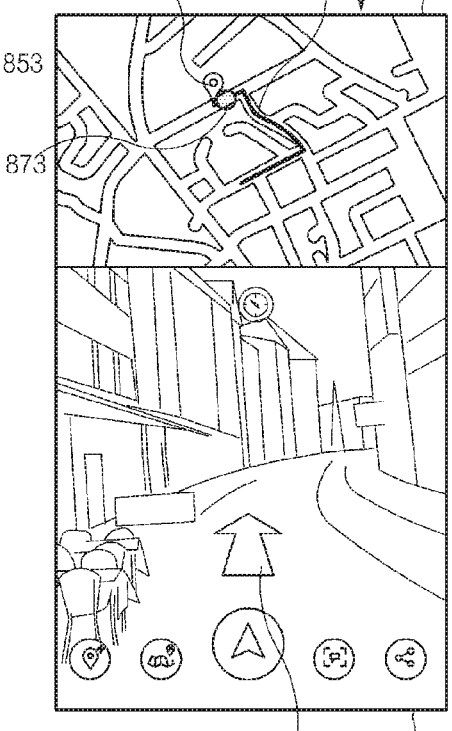

Referring to FIG. 8D, as the electronic device 100 is moved, the electronic device 100 may be located within a distance adjacent to a destination point. The electronic device 100 may display a fourth current location object 873 to be adjacent to the destination object 812 on a first region 870. The electronic device 100 may display the fourth current location object 873 adjacent to the destination object 812 on the route object 811 of the first region 870. As the electronic device 100 arrives near a destination, the electronic device 100 may display a fourth direction indication object 881 without displaying sub-map information. If the electronic device 100 is adjacent to the destination within a specified distance, the electronic device 100 may remove the fourth direction indication object 881 from a second region 880.

Figures 9A, 9B:
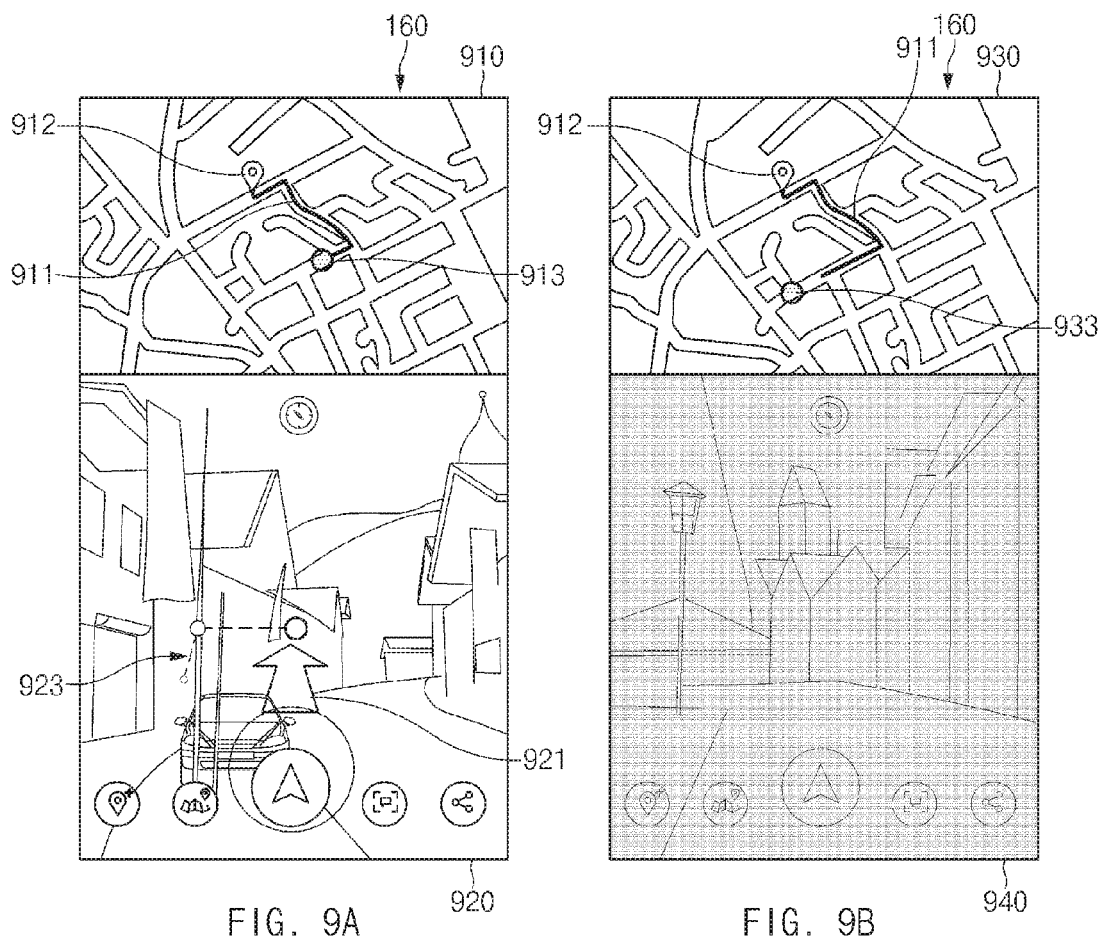
FIGS. 9A & 9B illustrate a screen interface associated with route deviation according to an embodiment of the present disclosure.

FIGS. 9A & B illustrate a screen interface associated with route deviation according to an embodiment.

Referring to FIG. 9A, as a function of providing map information is executed, an electronic device (for example, electronic device 100 of FIG. 2) may divide a screen of a display 160 into a first region 910 and a second region 920, may output main map information on the first region 910, and may output a live video on the second region 920. A destination object 912, a route object 911, and a first current location object 913 may be displayed on map information of the first region 910. As the electronic device 100 is moved, a point where the first current location object 913 is displayed may be changed. An orientation value of the main map information displayed on the first region 910, for example, a display orientation may be identical to an orientation of a direction in which the live video displayed on the second region 920 is obtained. Sub-map information 923 and a direction indication object 921 may be displayed on the second region 920.

Referring to FIG. 9B, if the electronic device (for example electronic device 100 of FIG. 2) moves and deviates from a specified route, it may display a second current location object 933 on a point which is not overlapped with the route object 911 displayed on a first region 930 of the display 160. In this case, the electronic device 100 may change a display effect of a second region 940 where a live video is displayed (e.g., process the second region 940 to be temporarily dark, turn off the second region 940, or output a specified error or warning message). In FIG. 9B, an embodiment is exemplified as the electronic device displays the second region 940 at brightness or less if a user of the electronic device deviates from a route.

FIGS. 10A, 10B. and 10C illustrate a change of a screen interface based on access to a designation according to an embodiment.

Referring to FIG. 10A, as a function of providing map information is executed an electronic device (for example, electronic device 100 of FIG. 2) may output main map information on a first region 1010 of a display 160 and may output a live video on a second region 1020. For example, a destination object 1012, a route object 1011, and a first current location object 1013 may be displayed on the first region 1010. For example, first sub-map information 1023, a first direction indication object 1025, and a first destination related image object 1021 may be displayed on the second region 1020. The first related image object 1021 may include first distance information (e.g., 830 m) from a current location to a destination.

Referring to FIG. 10B, as the electronic device 100 is moved, the electronic device 100 may move to be adjacent to a destination point. Thus, the destination object 1012, the route object 1011, and a second current location object 1033 more adjacent to the destination object 1012 than the first current location object 1013 may be displayed on a first region 1030 of the display 160. Alternatively, second sub-map information 1043, a second direction indication object 1045, and a second destination related image object 1041 may be displayed on a second region 1040. The second destination related image object 1041 may include second distance information (e.g., 600 m) from a current location to a destination. The second destination related image object 1041 may be displayed to be relatively brighter, have relatively higher resolution, and have relatively more details than the first destination related image object 1021.

Referring to FIG. 10C, as the electronic device 100 is moved, it may move to be more adjacent to a destination point. Thus, the destination object 1012, the route object 1011, and a third current location object 1053 more adjacent to the destination object 1012 than the second current location object 1033 may be displayed on a first region 1050 of the display 160. Alternatively, a third direction indication object 1065 and a third destination related image object 1061 may be displayed on the second region 1060. The third destination related image object 1061 may include third distance information (e.g., 300 m) from a current location to a destination. The third destination related image object 1061 may be displayed to be relatively brighter, have relatively higher resolution, and have relatively more details than the second destination related image object 1041. According to various embodiments, if the electronic device 100 is located within a specified distance, for example, 50 m, from a destination point, the electronic device 100 may stop displaying a live video on the entire second region 1060 and may display an image associated with a destination on the entire second region 1060. According to various embodiments, the electronic device 100 may output the number of steps corresponding to each of the first to third distance information, as well as the first to third distance information. In this regard, the electronic device 100 may provide the number of steps by dividing distance information by a step of a specified length (e.g., 80 cm) or may calculate and output the number of steps corresponding to a user of the electronic device 100 using a height and foot size of the user, obtained from user information.

Figure 11B:
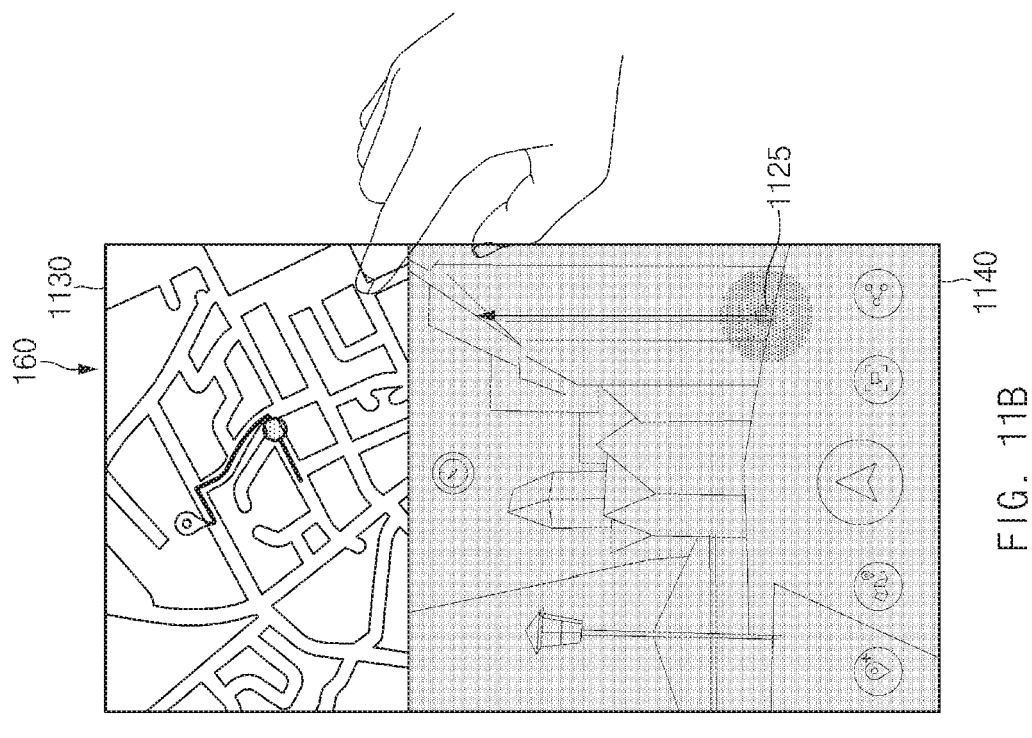
FIGS. 11A & 11B illustrate a change of a screen region of map information and a live video according to an embodiment of the present disclosure.
Figure 11A:
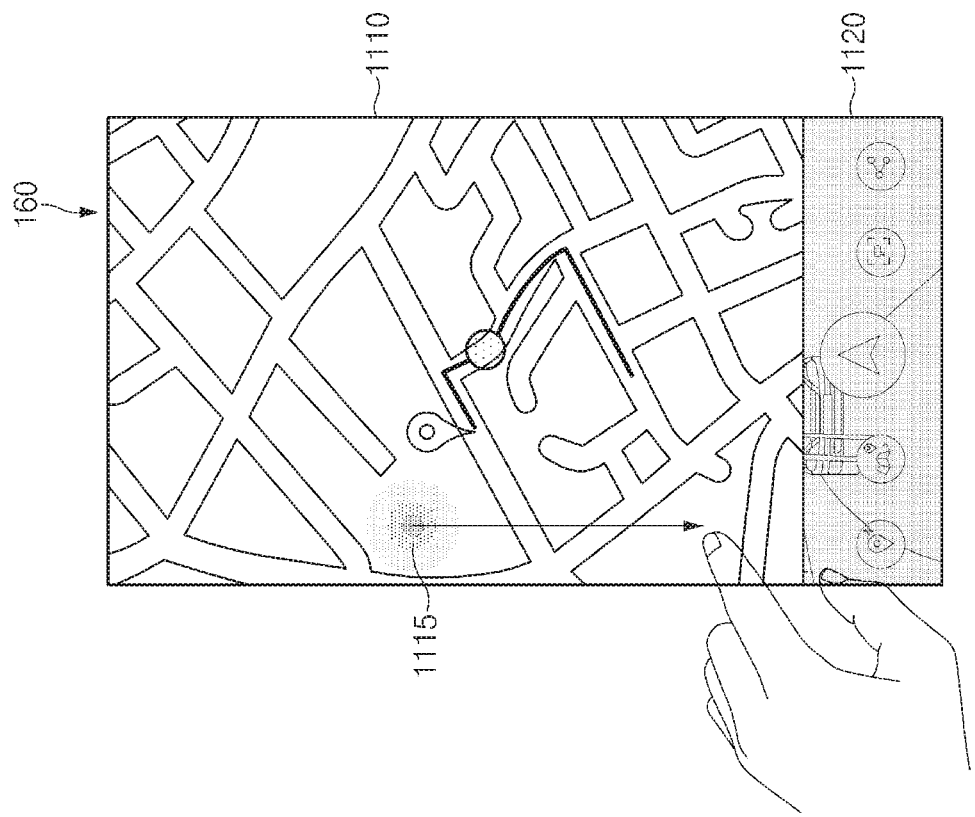

FIGS. 11A and 11B illustrate a change of a screen region of map information and a live video according to an embodiment.

Referring to FIG. 11A, as a function of providing map information is executed, an electronic device (for example, electronic device 100 of FIG. 2) may output main map information on a first region 1110 of a display 160 and may output a live video on a second region 1120. If a first input event 1115 associated with changing a previous second region is generated (e.g., if an event where a user touches an edge on which the previous second region is displayed and drags or swipes the touched edge in a direction where the second region contracts is generated), the electronic device 100 may change a size of the previous second region to the second region 1120 of a specified first size to display the second region 1120. As the second region 1120 of the first size is displayed, a size of the first region 1110 may also be changed. The electronic device 100 may change a form of displaying map information displayed on the first region 1110, and the like. According to various embodiments, the electronic device 100 may display the first region 1110 of a first size in which a scale of a previously displayed first region is expanded. Alternatively, the electronic device 100 may obtain and output map information of a broader area relative to its current location.

Referring to FIG. 11B, according to various embodiments, if a second input event 1125 for expanding the second region 1120 of the first size is generated (e.g., if an event where the user selects an edge of the second region 1120 of the first size and drags or swipes the selected edge in a direction where the second region 1120 of the first size expands is generated), the electronic device 100 may expand the second region 1120 of the first size to display a second region 1140 of a second size. As the second region 1140 of the second size is displayed, the electronic device 100 may change a size of the first region 1110 of the first size. For example, the electronic device 100 may display a first region 1130 of a second size (e.g., a size where a size of the first region 1110 of the first size contracts) in response to displaying the second region 1140 of the second size. In this operation, the electronic device 100 may reduce a size of map information displayed on the first region 1110 of the first size or may obtain map information of a size relative to its current location (e.g., map information of a narrower scale than state 1101), and may output the reduced or obtained map information on the first region 1130 of the second size.

FIGS. 12A, 12B, 12C, 12D, 12E, and 12F illustrate a method for correcting map information according to an embodiment.

Referring to FIG. 12A, in the method for correcting map information, an electronic device (for example, electronic device 100 of FIG. 2) may output map information on a region of a display 160. The electronic device 100 may collect information about a current location and may output a pop-up message 1210 about whether the current location is identical to a location displayed on the map information.

In FIG. 12B, if an input event that a location on a map is identical to a real location is generated (e.g., if an input event for selecting a virtual button indicating that the location on the map is identical to the real location is generated), the electronic device 100 may execute a route finding function. as shown in FIG. 12C. For example, the electronic device 100 may obtain (or product) route information based on current location information and obtained destination information (or may receive route information from a server 200 of FIG. 1).

In FIG. 12D, if an input event that the location on the map is not identical to the real location is generated (e.g., if an input event for selecting a virtual button indicating that the location on the map is not identical to the real location is generated), the electronic device 100 may output information about an error between the location on the map and a current location, as shown in FIG. 12E. Alternatively, the electronic device 100 may output guide information for requesting to move to a specific location (e.g., an "S" point) displayed on the map. as identified by FIG. 12F.

FIGS. 13A, 13B, 13C, 13D, 13E, and 13F illustrate a method for correcting map information according to an embodiment.

Referring to FIG. 13A, in the method for correcting map information, an electronic device (for example, electronic device 100 of FIG. 2) may output map information on a region of a display 160. The electronic device 100 may collect information about a current location and may output a pop-up message 1310 about a relationship between the current location and the periphery of the map information. In this regard, the electronic device 100 may obtain at least one of building information or road information located in a specified orientation relative to the current location.

In FIG. 13B, if an input event which agrees to an item questioned in the pop-up message 1310 is generated, as in FIG. 13C, the electronic device 100 may execute a route finding function. Referring to FIG. 13D, if an input event which does not agree to the item questioned in the pop-up message 1310 is generated, as in FIG. 13E, the electronic device 100 may output guide information for guiding that a direction of its user (or a direction in which a camera 180 of the electronic device 100 obtains a live video) indicates a specified direction. Alternatively, the electronic device 100 may output guide information for requesting to move to a specific location (e.g., an "S" point) displayed on the map, as identified by FIG. 13F.

Figure 14C:
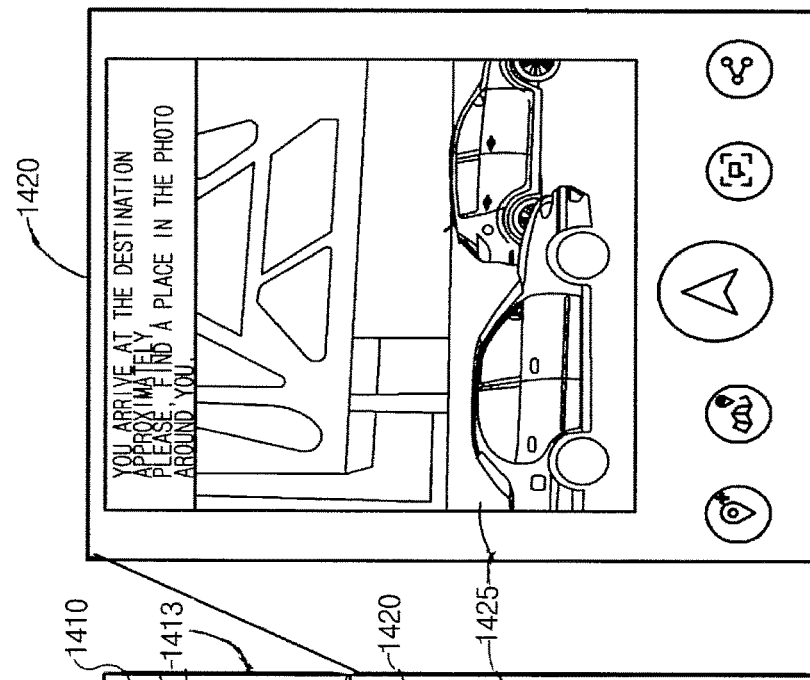
FIGS. 14A-14C illustrate a screen interface based on access to a destination according to an embodiment of the present disclosure.
Figure 14B:
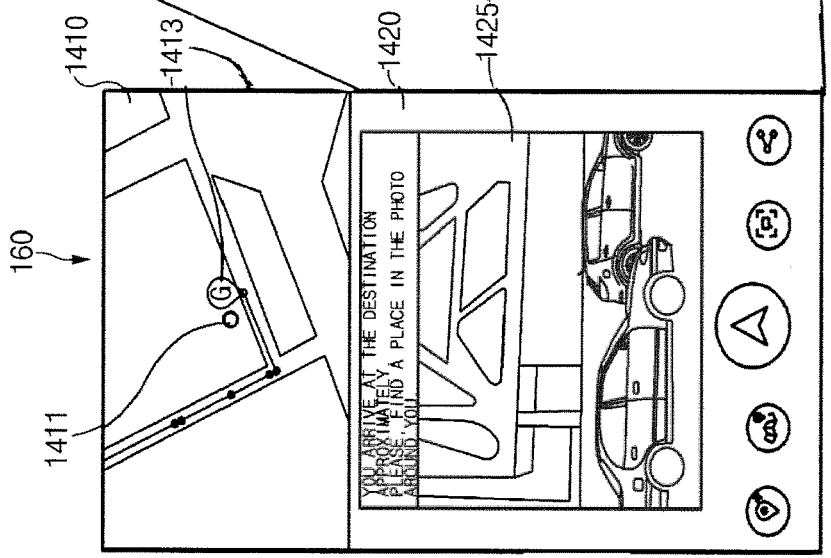
Figure 14A:
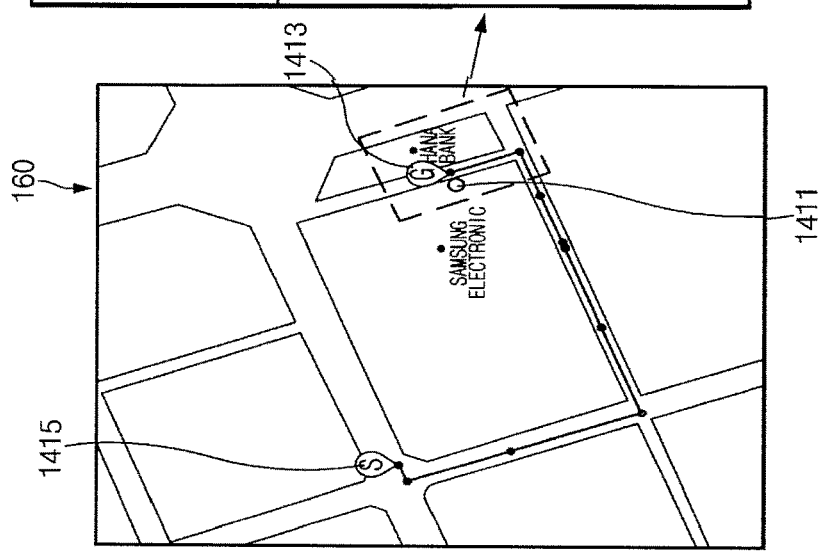

FIGS. 14A, 14B, and 14C illustrate a screen interface based on access to a destination according to an embodiment.

Referring to FIG. 14A, map information in which route information corresponding to inputting information about a start location 1415 and a destination 1413 is written may be output on a display 160 of an electronic device (for example, electronic device 100 of FIG. 2). As the electronic device 100 is moved, the electronic device 100 may change and display an object corresponding to a current location on map information in real time or at a period.

If a current location 1411 is located within a distance from the destination 1413, as in FIG. 14B, the electronic device 100 may output destination related image information 1425. According to various embodiments, as described above, the electronic device 100 may output map information on a first region 1410 of the display 160 and may output a live video on a second region 1420. If the current location 1411 of the electronic device 100 is within a distance from the destination 1413, the electronic device 100 may stop outputting the live video displayed on the second region 1420 and may display the destination related image object 1425 on the second region 1420. According to various embodiments, the electronic device 100 may output at least one of text information or image information describing the destination 1413 on the second region 1420.

According to various embodiments, the electronic device 100 may output the number of steps corresponding to a distance between a current location and a destination on the display 160. In this regard, the electronic device 100 may obtain height information of its user (e.g., receive height information from him or her or obtain height information from user profile information) and may calculate an average step based on the height information. In this operation, the electronic device 100 may calculate a portion where steps are overlapped upon walking, in consideration of a foot size. For example, the electronic device 100 may calculate a step size based on Equation 1 below.

$$(\text{height} \times 100)/2 \times \text{foot size} = \text{step size} \quad [\text{Equation 1}]$$

The electronic device 100 may calculate the number of steps corresponding to a distance between a current location and a destination based on the calculated step size and may output the calculated number of steps on a specified region (e.g., a region where a live video is output and the like).

FIGS. 15A and 15B illustrate an operation of rotating map information according to an embodiment.

Referring to FIG. 15A, in connection with rotating map information, an electronic device (for example, electronic device 100 of FIG. 2) may output the map information on a region of a display 160. The electronic device 100 may output a first rotation control object 1510 and a second rotation control object 1520, which may rotate map information in a direction. The first rotation control object 1510 may be displayed at a right lower side of a region where the map information is displayed, and the second rotation control object 1520 may be displayed at a left lower side of the region where the map information is displayed.

The first rotation control object 1510 may be configured to rotate the map information in a first direction (e.g., clockwise). For example, the first rotation control object 1510 may be configured to rotate an orientation of the map information displayed on the display 160 clockwise (or from the east to the west or from the west to the east) by a specified angle in response to the number of touches or a length of a touch hold time. Alternatively, the first rotation control object 1510 may be configured to rotate an orientation of the map information in a first direction in response to a size dragged after a touch or an angle dragged after the touch.

The second rotation control object 1520 may be configured to rotate the map information in a second direction (e.g., counterclockwise). For example, the second rotation control object 1520 may be configured to rotate an orientation of the map information displayed on the display 160 counterclockwise by a specified angle in response to the number of touches or a length of a touch hold time. Alternatively, the second rotation control object 1520 may be configured to rotate an orientation of the map information in a second direction in response to a size dragged after a touch or an angle dragged after the touch. According to an embodiment, as shown in FIG. 15A, under control of the first rotation control object 1510, as in FIG. 15B, the electronic device 100 may output map information rotated at an angle on the display 160.

According to various embodiments, the electronic device may more easily understand map information by matching a reading direction of the map information to a direction of a real environment. Further, according to various embodiments, the electronic device may intuitively search a destination by providing various user interfaces based on access to the destination.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer.

Although the present disclosure has been described with various exemplary embodiments, various changes and modifications may be suggested to one skilled in the art. It is intended that the present disclosure encompass such changes and modifications as fall within the scope of the appended claims.

What is claimed is:
1. An electronic device, comprising:
a display;
a camera;
a location information sensor configured to obtain current location information of the electronic device;
a direction information sensor configured to obtain direction information including a direction in which the camera is facing when it obtains an image;
a memory; and
a processor configured to operatively connect with the display, the camera, the location information sensor, the direction information sensor, and the memory and configured to:
obtain map information associated with a current location of the electronic device while the camera is executing,
obtain a direction of a live video obtained by the camera,
arrange a direction of the map information being identical to the direction of the live video, and
display, on the display, the map information and the live video.

2. The electronic device of claim 1, wherein the processor is configured to:
output the map information on a first region of the display;
output the live video on a second region of the display; and
arrange and display the direction of the obtained map information with an orientation of the direction information in response to a user input.

3. The electronic device of claim 1, wherein the processor is configured to:
obtain route map information including first route information produced based on information corresponding to a destination and, wherein the information associated with the current location is written; and
arrange and display an orientation of the obtained route map information with an orientation of the direction information.

4. The electronic device of claim 1, wherein the processor is configured to:
in response to an orientation of changed direction information being based on movement of the electronic device, adjust a displayed orientation of the obtained map information; and
display the adjusted orientation of the obtained map information.

5. The electronic device of claim 1, wherein the processor is configured to:
output sub-map information, on a display, the sub-map information corresponding to route information produced based on information in correspondence with a destination and the information associated with the current location on a region where the live video is output.

6. The electronic device of claim 5, wherein the processor is configured to:
change a form of the sub-map information based on a changed destination including a distance or direction, if the distance or direction from the current location to the changed destination is changed in response to a movement of the electronic device; and
display only a route from the current location to the changed destination.

7. The electronic device of claim 1, wherein the processor is configured to:
display a direction indication object corresponding to a progress direction oriented from the current location to a destination, based on a route produced using information in correspondence with the destination and the information associated with the current location; and
display the direction indication object, wherein the direction is changed if necessary or if the electronic device arrives at an intersection area based on movement of the electronic device.

8. The electronic device of claim 1, wherein the processor is configured to:
output a display effect for notifying route deviation, if the electronic device deviates from the current location on a route produced based on information associated with a destination and the information corresponding to the current location.

9. The electronic device of claim 1, wherein the processor is configured to:
display an image object associated with a destination using a different display form based on a distance between the current location and the destination.

10. The electronic device of claim 1, wherein the processor is configured to:
   stop outputting the live video, if a distance between the current location and a destination is less than a threshold distance; and
   output a destination related image object on a region where the live video was output.

11. The electronic device of claim 1, wherein the processor is configured to:
   output a number of steps corresponding to a distance between the current location and a destination.

12. The electronic device of claim 1, wherein the processor is configured to:
   execute a route finding function for destination information based on receiving a user input for determining whether the current location is a same as a start location displayed on a map; or
   outputting guide information for guiding movement of the start location.

13. A method for providing map information, the method comprising:
   obtaining current location information of an electronic device or sensing direction information including a direction in which a camera, of the electronic device, is facing when it obtains an image;
   obtaining map information corresponding to the current location;
   obtaining a direction of a live video obtained by the camera;
   arranging a direction of the map information being identical to the direction of the live video; and
   displaying, on a display, the map information and the live video.

14. The method of claim 13, wherein displaying comprises:
   outputting the map information on a first region of a display of the electronic device and outputting the live video on a second region of the display; and
   arranging and displaying the direction of the obtained map information with an orientation of the direction information in response to a user input.

15. The method of claim 13, further comprising:
   obtaining route map information including first route information produced based on information associated with a destination and, wherein the information associated with the current location is written; and
   arranging and displaying an orientation of the obtained route map information with an orientation of the direction information.

16. The method of claim 13, further comprising:
   in response to an orientation of changed direction information being based on movement of the electronic device, adjusting a displayed orientation of the obtained map information.

17. The method of claim 13, further comprising:
   displaying sub-map information corresponding to at least part of route information produced based on information associated with a destination and the information associated with the current location on a region where the live video is output.

18. The method of claim 17, wherein the displaying of the sub-map information comprises:
   changing a form of the sub-map information based on a changed destination including a distance or direction, if the distance or direction from the current location to the changed destination is changed in response to a movement of the electronic device; and
   displaying only a route from the current location to the changed destination.

19. The method of claim 13, further comprising:
   producing a route using information associated with a destination and the information corresponding to the current location; and
   the method further comprising at least one of:
      displaying a direction indication object corresponding to a progress direction; and
      displaying the direction indication object, wherein the direction is changed if necessary, or if the electronic device arrives at an intersection area based on movement of the electronic device;
      outputting a display effect for notifying route deviation, if the electronic device deviates from the current location on the produced route;
      displaying an image object associated with the destination using a different display form based on a distance between the current location and the destination;
      stopping the outputting of the live video, if the distance between the current location and a destination is less than a threshold distance;
      outputting a destination related image object on a region where the live video was output; or
      outputting a number of steps corresponding to the distance between the current location and the destination.

20. The method of claim 13, further comprising:
   executing a route finding function for destination information based on receiving a user input for determining whether the current location is a same as a start location displayed on a map; or
   outputting guide information for guiding movement of the start location.

* * * * *